June 20, 1933.  F. MAGUSIN  1,915,234
COMBINED CHILD'S VEHICLE AND SUPPORT
Filed Feb. 9, 1932  2 Sheets-Sheet 1
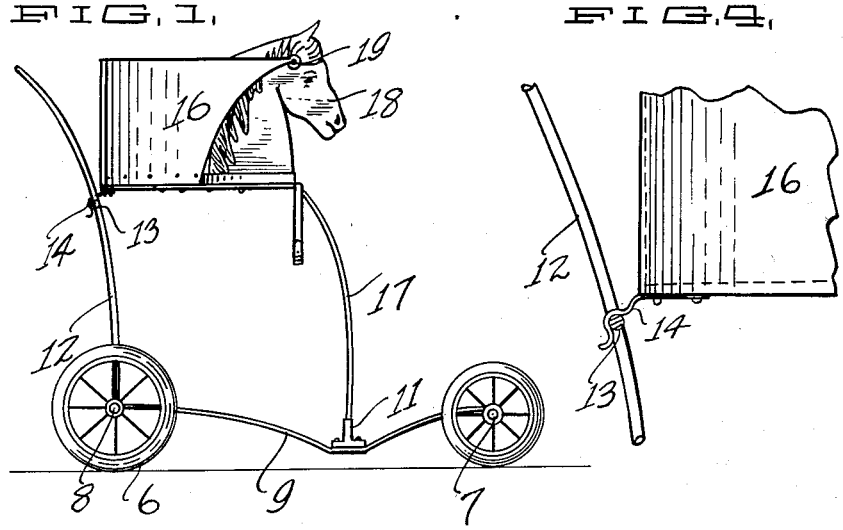
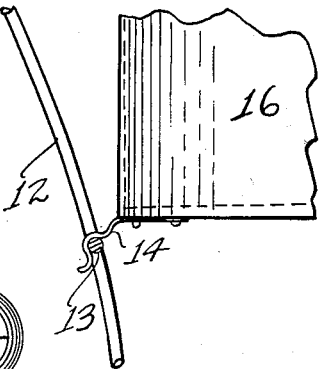
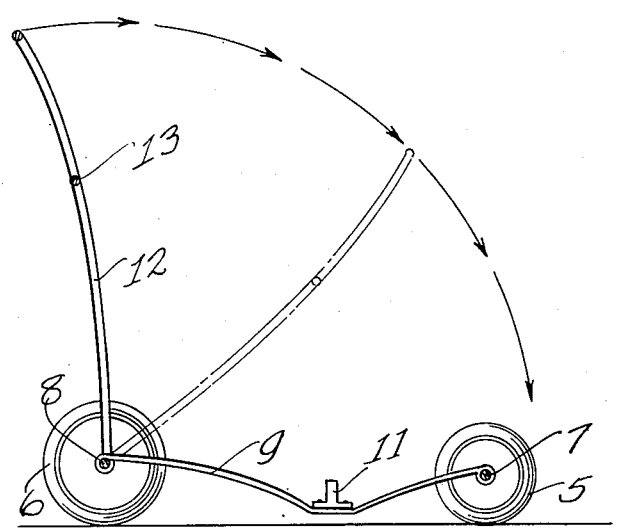
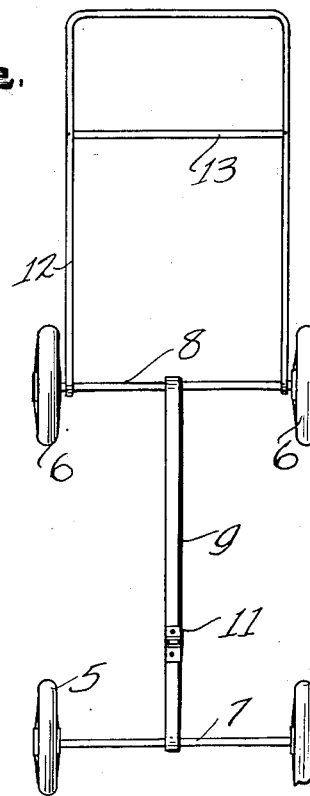
INVENTOR.
FRANK MAGUSIN
BY Victor J. Evans & Co.
ATTORNEYS.

June 20, 1933.　　　F. MAGUSIN　　　1,915,234
COMBINED CHILD'S VEHICLE AND SUPPORT
Filed Feb. 9, 1932　　　2 Sheets-Sheet 2
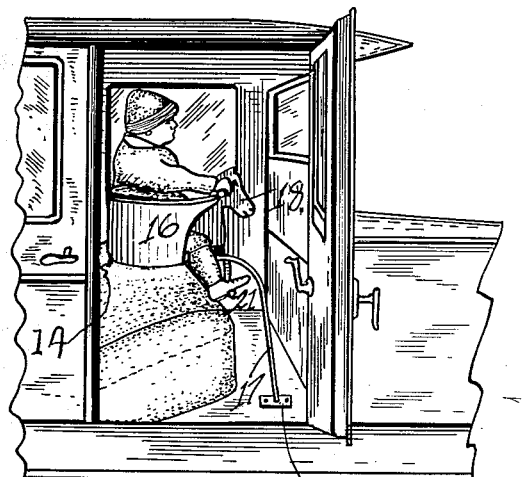
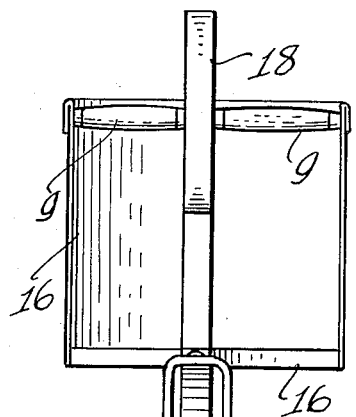
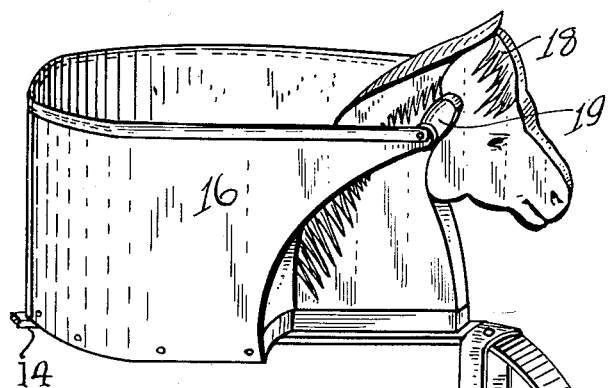
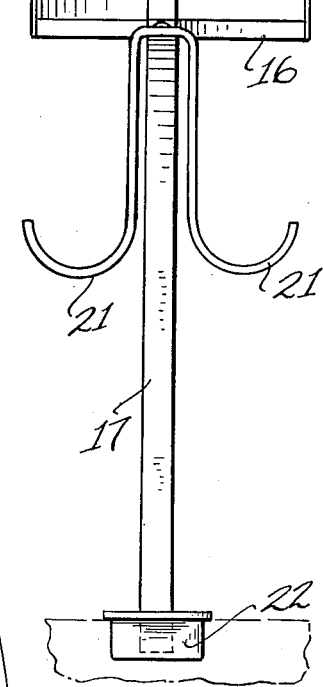
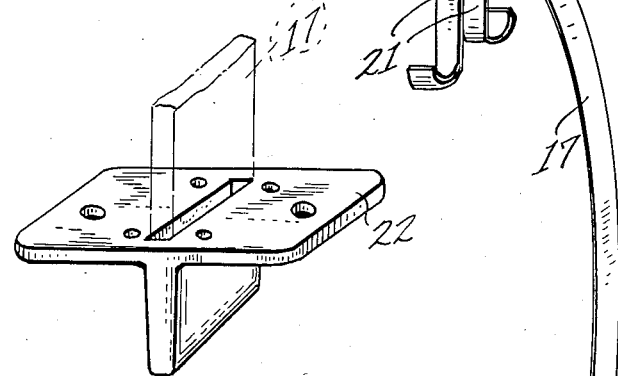
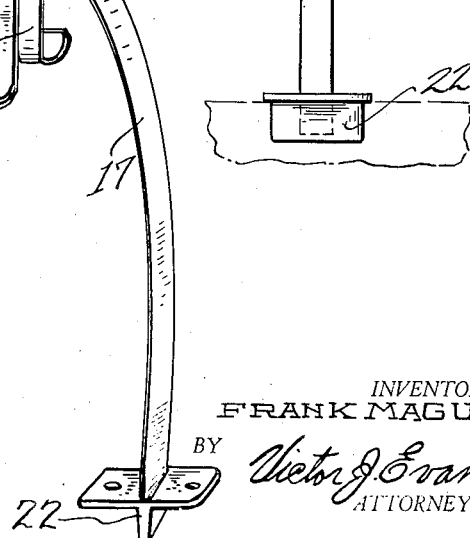
INVENTOR.
FRANK MAGUSIN.
BY
ATTORNEYS.

Patented June 20, 1933

1,915,234

UNITED STATES PATENT OFFICE

FRANK MAGUSIN, OF HOLLYWOOD, CALIFORNIA, ASSIGNOR TO BABY SAVER COMPANY, OF CINCINNATI, OHIO

COMBINED CHILD'S VEHICLE AND SUPPORT

Application filed February 9, 1932. Serial No. 591,865.

This invention relates to improvements in a combined child's vehicle and support.

The principal object of the invention is to provide means whereby the child may be positioned in a seat arrangement which seat arrangement may be transported from point to point and adjusted in a suitable bracket, which bracket may be mounted upon a wheeled carriage or a stationary member such as the floor of a room or a motor vehicle.

Another object is to produce a device of this character wherein the child may be picked up while still positioned in the vehicle and transported.

A further object is to produce a device whereby the child is resiliently supported.

A still further object is to produce a device which is simple in construction and therefore economical to manufacture.

Other objects and advantages will be apparent during the course of the following description.

In the accompanying drawings forming a part of this specification and in which like numerals are employed to designate like parts throughout the same, Fig. 1 is a side elevation of my device as the same appears in use, Fig. 2 is a top plan view of the chassis of my device, Fig. 3 is a side elevation of Fig. 2, showing the manner in which the handle of the chassis may be folded for the purpose of transportation, Fig. 4 is a fragmentary view showing the manner in which the rear portion of the seat is attached to a cross member upon the handle of the chassis, Fig. 5 is an illustrated view showing the manner in which my device is removed from the chassis and secured in a socket placed in the floor of a motor vehicle, Fig. 6 is a perspective view of the seat portion of my device and a floor socket attached thereto, Fig. 7 is a front elevation of Fig. 6, and Fig. 8 is a perspective view of a floor socket.

My device is essentially a perambulator, whereby the child may be placed in the same, and wheeled over a surface and when desired the seat portion of the perambulator may be lifted from the chassis and carried to a distant point where the seat portion may be engaged with a suitable support, for instance, positoned in the floor. This arrangement is different than an ordinary baby carriage or perambulator where the child must remain in the vehicle as long as any portion the vehicle is in use. This prevents such a vehicle from having any utility such as applicant has provided, for with applicant's device the seat portion may be employed for the general support of the child or as a support in a motor vehicle when the chassis portion is not being used. When used in a motor vehicle the arrangement is such that the child is raised above the height of the ordinary seat so that the child enjoys the same view as the older person in the car, and further the child may be positioned therein in such a manner that accident to the child will be avoided.

In the accompanying drawings wherein for the purpose of illustration is shown a preferred embodiment of my invention, the numerals 5 and 6 designate front and rear wheels, respectively, the wheels 5 being carried upon a front axle 7 and the wheels 6 upon the axle 8. A connecting member 9 extends between the axles 7 and 8 and has a bracket 11 mounted thereon. A handle 12 is pivoted to the axle 8 and has a cross rod 13 which cross rod is adapted to be engaged by a clip 14 which is attached to the seat portion 16. This seat portion is supported upon a resilient spring member 17. I prefer to provide the seat with a fanciful head 18 and handles 19 which are attractive to the child.

Stirrups 21 serve to support the child's feet. In Figs. 5, 6, 7 and 8 I have shown a bracket 22 which bracket may be supported in the floor of a motor vehicle or in the floor of a residence so that the spring member may have its free end inserted therein which will support the seat portion in a manner to be hereinafter described.

When the parts are in the position shown in Fig. 1, the whole device is adapted to be wheeled over on a surface and acts purely as a perambulator, the spring member 17 being of such a construction that it will absorb practically all of the jars incident to rough places. By providing the handle 12 so that it folds, as shown in Fig. 3, it will be obvious that the child may be picked up together with the seat portion and its attached spring 17, the handle 12 folded against the axle 7 and the entire device taken into a confined space such as a motor vehicle or a trolley car.

When it is desired to place the seat portion in a permanent position for the time being, the lower end of the spring 17 is inserted in a bracket previously placed at designated points, for instance, as shown in Fig. 5 a bracket is supported in the floor of a motor vehicle so that the child in the seat is supported above the customary cushions. These brackets may be positioned adjacent counters so that mothers may employ the same to holding the child, during shopping.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, a chassis comprising a pair of spaced axles, wheels mounted on said axles, a cross member extending between said axles, a bracket positioned on said cross member, a spring removably positioned in said bracket and extending upwardly therefrom, a seat arrangement secured to said spring, and a pivoted handle pivoted to one of said axles and detachably secured to said seat arrangement.

In testimony whereof I affix my signature.

FRANK MAGUSIN.